(12) United States Patent
Arimatsu et al.

(10) Patent No.: US 11,385,759 B2
(45) Date of Patent: Jul. 12, 2022

(54) INFORMATION PROCESSING APPARATUS, INFORMATION PROCESSING METHOD, AND PROGRAM

(71) Applicant: SONY INTERACTIVE ENTERTAINMENT INC., Tokyo (JP)

(72) Inventors: Kazuyuki Arimatsu, Tokyo (JP); Hiroshi Matsuike, Tokyo (JP); Yasushi Okumura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/766,097

(22) PCT Filed: Dec. 19, 2017

(86) PCT No.: PCT/JP2017/045523
§ 371 (c)(1),
(2) Date: May 21, 2020

(87) PCT Pub. No.: WO2019/123530
PCT Pub. Date: Jun. 27, 2019

(65) Prior Publication Data
US 2020/0356235 A1    Nov. 12, 2020

(51) Int. Cl.
*G06F 3/04815*        (2022.01)
*A63F 13/57*          (2014.01)
(Continued)

(52) U.S. Cl.
CPC .......... *G06F 3/04815* (2013.01); *A63F 13/57* (2014.09); *G06F 3/01* (2013.01);
(Continued)

(58) Field of Classification Search
CPC ...... G06F 3/04815; G06F 3/01; G06F 3/0346; G06F 3/0481; G06F 3/167; G06F 3/014; A63F 13/57
See application file for complete search history.

(56) References Cited

U.S. PATENT DOCUMENTS 6,310,604 B1 * 10/2001 Furusho ............. C10M 171/001
                                              345/156
6,407,679 B1 *  6/2002 Evans ..................... G06F 3/014
                                              341/20
(Continued)

FOREIGN PATENT DOCUMENTS

| JP | H08-215211 A  | 8/1996 |
| JP | 2006-259926 A | 9/2006 |
| JP | 2008-165488 A | 7/2008 |

OTHER PUBLICATIONS

Crajé, Céline et al. "Effects of visual cues of object density on perception and anticipatory control of dexterous manipulation." PloS one vol. 8,10 e76855. Oct. 16, 2013, doi:10.1371/journal.pone.0076855 (Year: 2013).*

(Continued)

*Primary Examiner* — James T Tsai
(74) *Attorney, Agent, or Firm* — Katten Muchin Rosenman LLP

(57) ABSTRACT

A virtual object is arranged in a virtual space, and an image in the virtual space is generated to be presented to a user. In addition, information indicating an operation from the user is received, a virtual manipulator for operating the virtual object is displayed in the virtual space in accordance with the received information indicating the operation, the magnitude of a virtual force applied to the virtual object by the virtual manipulator is determined, and information indicating the determined magnitude of the force is presented to the user.

9 Claims, 5 Drawing Sheets

(51) Int. Cl.
*G06F 3/0346* (2013.01)
*G06F 3/16* (2006.01)
*G06F 3/0481* (2022.01)
*G06F 3/01* (2006.01)

(52) U.S. Cl.
CPC .......... *G06F 3/0346* (2013.01); *G06F 3/0481* (2013.01); *G06F 3/167* (2013.01); *G06F 3/014* (2013.01)

(56) References Cited

U.S. PATENT DOCUMENTS

| | | | | |
|---|---|---|---|---|
| 8,875,041 | B1* | 10/2014 | Desai | G06F 3/04847 |
| | | | | 715/771 |
| 10,275,025 | B2* | 4/2019 | Black | G06F 3/016 |
| 10,423,226 | B2* | 9/2019 | Chen | G06F 3/016 |
| 2002/0146672 | A1* | 10/2002 | Burdea | A63B 23/16 |
| | | | | 434/258 |
| 2006/0132455 | A1* | 6/2006 | Rimas-Ribikauskas | G06F 3/0414 |
| | | | | 345/173 |
| 2008/0162097 | A1* | 7/2008 | Ishikawa | G06F 30/23 |
| | | | | 703/6 |
| 2010/0245237 | A1* | 9/2010 | Nakamura | A63F 13/02 |
| | | | | 345/156 |
| 2015/0227203 | A1* | 8/2015 | Chen | G06F 3/0304 |
| | | | | 345/173 |
| 2018/0121009 | A1* | 5/2018 | Feng | G06F 3/04812 |
| 2019/0228591 | A1* | 7/2019 | Giurgica-Tiron | G06T 15/005 |

OTHER PUBLICATIONS

International Search Report and Written Opinion dated Feb. 6, 2018, from International Application No. PCT/JP2017/045523, 7 sheets.
International Preliminary Report on Patentability dated Jul. 2, 2020, from International Application No. PCT/JP2017/045523, 14 sheets.
Notice of Reasons for Refusal dated Jul. 6, 2021, from Japanese Patent Application No. 2019-559894, 4 sheets.

* cited by examiner (a)

(b)

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

There are information processing apparatuses each of which arranges virtual objects (for example, blocks or the like) in a virtual space and performs a process of stacking blocks or the like in the virtual space by a user's operation.

At this time, for example, a method is known in which virtual fingers (manipulator) corresponding to the user's fingers are displayed in the virtual space, and the position of the manipulator and the posture (bending degree) of the fingers are changed by the user's operation, and meanwhile it is determined whether or not the fingers pinch a virtual block in the virtual space, so that while the block is determined to be pinched, the movement of the manipulator is synchronized with the movement of the pinched virtual block, and thereby a display is made as if a block is moved in a virtual space while being held.

SUMMARY

Technical Problem

However, in the conventional operation interface described above, since the virtual object and the manipulator look different from the reality in the virtual space when viewed from the user's visual field, and when the virtual object is virtually pinched, it is not always easy to give the user feedback indicating that the user has pinched the object, so that the user does not know surely whether or not the object is actually pinched or how much force is used for pinching, and thus there is a problem that the operability is low.

The present invention has been made in view of the above circumstances, and an object of the invention is to provide an information processing apparatus, an information processing method, and a program that can improve operability of the user.

Solution to Problem

The present invention that solves the problem of the above conventional example relates to an information processing apparatus that arranges a virtual object in a virtual space, generates an image in the virtual space, and presents the image to a user, and the apparatus includes receiving means for receiving information presenting an operation from the user, manipulator display means for displaying a virtual manipulator for operating the virtual object in the virtual space in accordance with the received information presenting the operation, determining means for determining a magnitude of a virtual force applied by the virtual manipulator to the virtual object, and presenting means for presenting information indicating the determined magnitude of the force to the user.

According to the present invention, the user's operability can be improved.

DESCRIPTION OF EMBODIMENT

An embodiment of the present invention will be described with reference to the drawings. Note that regarding the following description, the size, ratio, arrangement, and the like of each part are merely examples, and the example of the present embodiment is not limited due to the illustrated size, ratio, and arrangement.

Figure 1:
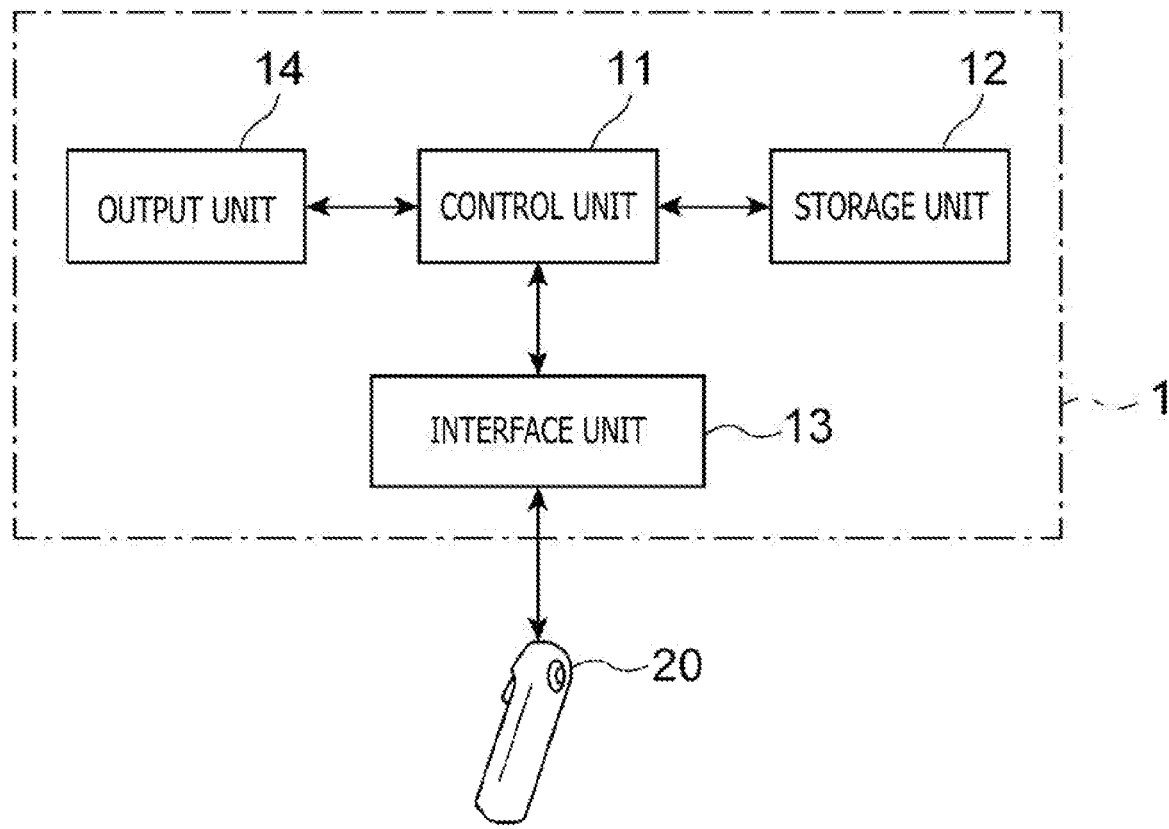
FIG. 1 is a block diagram illustrating a configuration example of an information processing apparatus according to an embodiment of the present invention.

The information processing system according to the embodiment of the present invention is a system including a computer device such as a home game machine, and includes an information processing apparatus 1 such as a home game machine body and an operation device 20 connected to the information processing apparatus 1 as illustrated in FIG. 1.

The operation device 20 is held by at least one of the left hand and the right hand of the user. Further, the operation device 20 may be fixed to a user's hand with a belt or the like.

Figure 2:
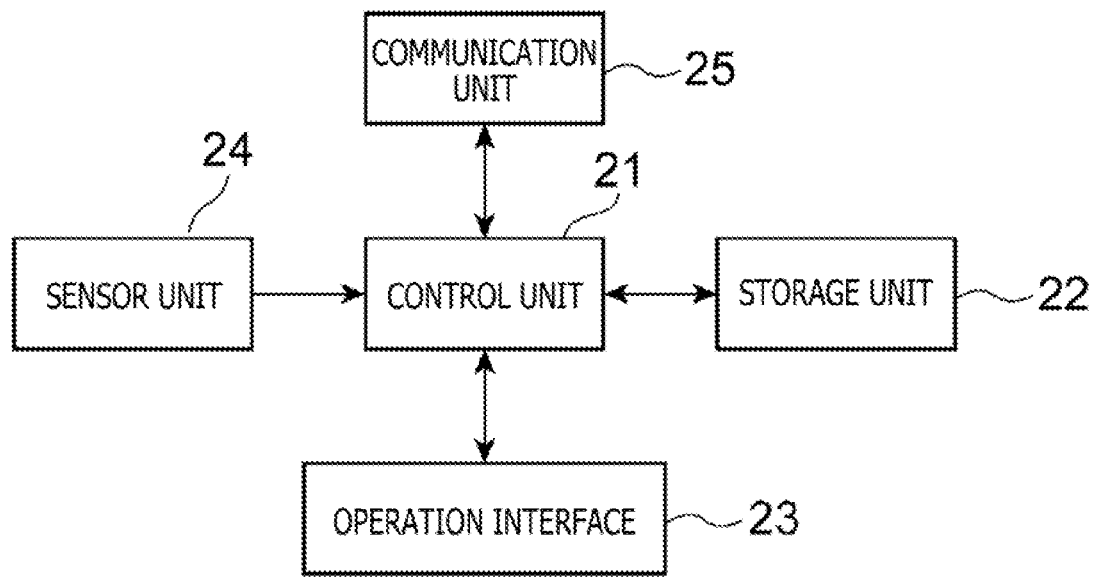
FIG. 2 is a block diagram illustrating a configuration example of an operation device connected to the information processing apparatus according to the embodiment of the present invention.

The operation device 20 has a circuit part including a control unit 21, a storage unit 22, an operation interface 23, a sensor unit 24, and a communication unit 25, as schematically illustrated in FIG. 2.

Figure 3:
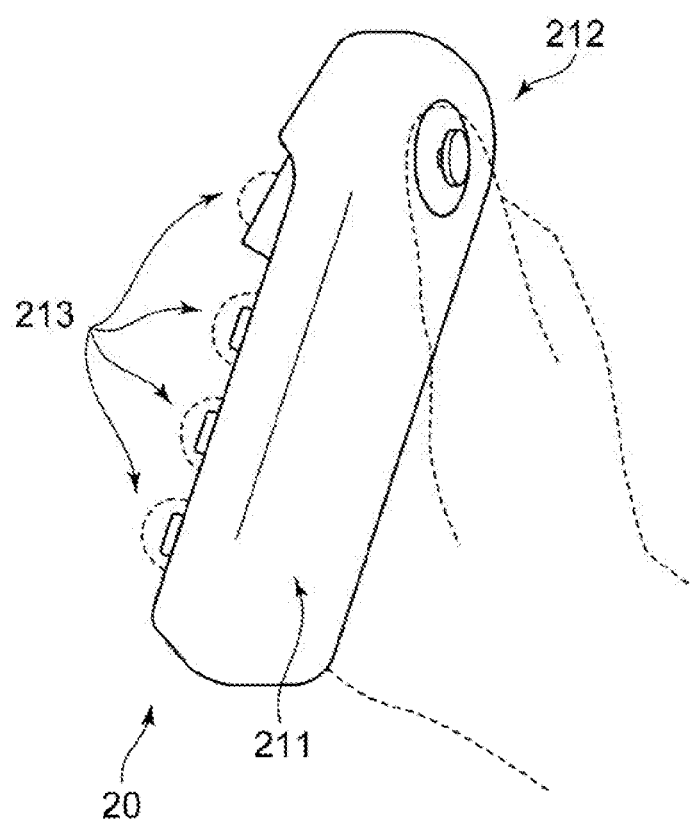
FIG. 3 is an explanatory diagram illustrating a schematic example of the operation device connected to the information processing apparatus according to the embodiment of the present invention.

The operation device 20 includes a grip portion 211 that is gripped by a user, an operation unit 212, and finger motion detecting units 213, as an outline profile is illustrated in FIG. 3. The grip portion 211 has a substantially polygonal column shape in an example of the present embodiment. The operation unit 212 is formed continuously from the grip portion 211, and includes a button and the like in the example of FIG. 2. The finger motion detecting unit 213 is one of the sensors included in the sensor unit 24, and obtains information regarding the degree of bending of the user's fingers when the user grips a device main body 210, and outputs information regarding the detection result. Incidentally here, the information regarding the degree of bending of the fingers may be information regarding the angles of the finger joints, for example. The joint here is not the actual joint of the user, and it is sufficient that the finger is modeled so as to have only one joint between the base of the finger and the fingertip, so that the angle of the joint assumed to be between the base of the finger and the fingertip is estimated. Since there are widely known methods for such estimation, such as estimation using a bone model, and these methods can be adopted, detailed description thereof is omitted here. Note that the finger motion detecting unit 213 may also serve as the operation unit 212.

The size of the operation device 20 is such that when the user naturally grips the device main body 210, one end thereof is located slightly outside the position where the tip of the user's thumb (what is called a thumb) reaches, and the other end slightly protrudes from the base of the little finger (a position corresponding to the MP (Metacarpophalangeal) joint). Note that the operation device 20 may be fixed to the user's hand with a belt or the like (not illustrated) so that the operation device 20 does not fall even when the user opens the user's hand with the operation device 20 mounted.

The control unit 21 according to the present embodiment is a program control device such as a CPU (Central Processing Unit), and operates in accordance with a program stored in the storage unit 22. In the present embodiment, the control unit 21 outputs information indicating the content of the operation performed by the user on the button operation unit 231 or the like of the operation unit 212 via the operation interface 23 or the degree of bending of the user's fingers detected by the sensor unit 24 to the information processing apparatus 1 via the communication unit 25 as operation information. Further, the control unit 21 controls each part of the operation device 20 in accordance with the information received from the information processing apparatus 1 via the communication unit 25.

The storage unit 22 is a memory device or the like, and stores a program executed by the control unit 21. The program may be provided, while being stored in a computer readable and non-transitory storage medium, and may be copied to the storage unit 22. In addition, the storage unit 22 also operates as a work memory of the control unit 21.

The operation interface 23 outputs information indicating the content of the operation performed by the user on the button operation unit 231 or the like provided in the operation unit 212 to the control unit 21. The sensor unit 24 includes at least one sensor including the finger motion detecting unit 213, and outputs information output by each sensor to the control unit 21.

In an example of the present embodiment, the finger motion detecting unit 213 may be configured by an infrared sensor, and may measure the distance from the device main body 210 to the fingertip of each finger to estimate the degree of bending of each finger on the basis of the distance. Further, the finger motion detecting unit 213 may be a depth camera or the like, and may estimate a bending degree of each finger by measuring a distance from the device main body 210 to each point of each finger. In yet another example, the finger motion detecting unit 213 may be an analog switch (a switch that outputs information indicating the amount of depression in multiple stages) provided for each finger related to the operation. In this case, information regarding the degree of bending of the corresponding finger is estimated and output on the basis of the amount of depression of the corresponding analog switch. Further, the sensor unit 24 may include another sensor such as an acceleration sensor.

The communication unit 25 is a wired interface such as a USB (Universal Serial Bus) interface or a wireless interface such as Bluetooth (registered trademark), and outputs various information to the information processing apparatus 1 in accordance with an instruction input from the control unit 21.

As illustrated in FIG. 1, the information processing apparatus 1 includes a control unit 11, a storage unit 12, an interface unit 13, and an output unit 14. The control unit 11 is a program control device such as a CPU, and operates in accordance with a program stored in the storage unit 12. In the present embodiment, the control unit 11 executes processing of arranging a virtual object in a virtual space, and generating an image in the virtual space to present the image to the user, as processing of a game application, for example. In addition, the control unit 11 receives information representing an operation from the user from the operation device 20, and displays a virtual manipulator that operates a virtual object in a virtual space generated by the processing of the game application or the like, in accordance with the accepted information representing the operation. Then, the control unit 11 determines the magnitude of the virtual force given to the virtual object by the virtual manipulator, and presents information indicating the determined magnitude of the force to the user. The specific processing contents of the control unit 11 will be described later in detail.

The storage unit 12 is a memory device or the like, and stores a program executed by the control unit 11. The program may be provided, while being stored in a computer readable and non-transitory storage medium, and may be copied to the storage unit 12. The storage unit 12 also operates as a work memory of the control unit 11.

The interface unit 13 is connected to the operation device 20 wirelessly or wiredly, and receives information related to a user's operation from the operation device 20, thereby outputting the information to the control unit 11. The output unit 14 has an interface for outputting images or the like to a home television or a head mounted display, such as an HDMI (High-Definition Multimedia Interface (registered trademark)). The output unit 14 outputs information of images to be displayed in accordance with an instruction input from the control unit 11.

Figure 4:
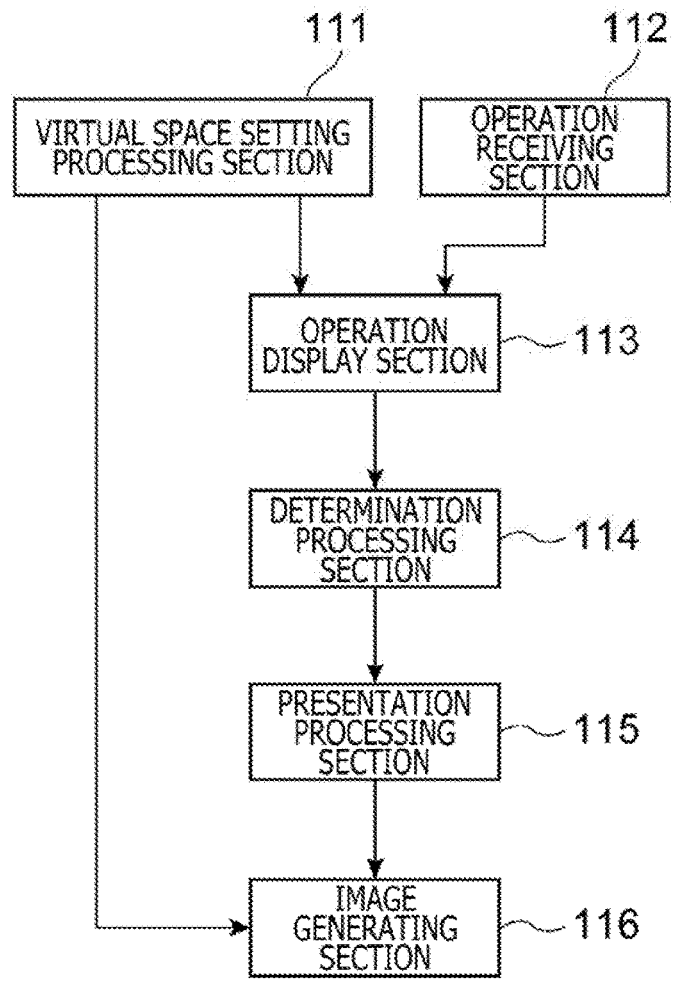
FIG. 4 is a functional block diagram illustrating an example of the information processing apparatus according to the embodiment of the present invention.

Next, the operation of the control unit 11 of the information processing apparatus 1 will be described. The control unit 11 functionally includes a virtual space setting processing section 111, an operation receiving section 112, an operation display section 113, a determination processing section 114, a presentation processing section 115, and an image generating section 116 as illustrated in FIG. 4.

The virtual space setting processing section 111 sets information regarding a hypothetical space (virtual space) such as a game space in the process of processing an application program such as a game application. In the example of the present embodiment, this virtual space is assumed to be a three-dimensional space. To be specific, the virtual space setting processing section 111 generates information indicating that the designated virtual object is arranged at a position in the virtual space designated by the application program. Since a widely known method can be adopted for an example of such information in the virtual space, a detailed description thereof is omitted here.

The operation receiving section 112 receives information indicating an operation from a user, which is output from the operation device 20. In one example of the present embodiment, this information includes information indicating the bending degree of at least some of the fingers of the user. Further, the operation receiving section 112 may receive information regarding the position and posture (such as the normal direction to the palm) of the hand of the user holding the operation device 20. The information regarding the movement of the position of the user's hand may be acquired by detecting the movement of the operation device 20 by a camera (not illustrated), for example, or may be obtained on the basis of a detection result of an acceleration sensor or the like included in the operation device 20.

The operation display section 113 displays a virtual manipulator for operating a virtual object in the virtual space set by the virtual space setting processing section 111 in response to the information representing the operation received by the operation receiving section 112.

Figure 5:
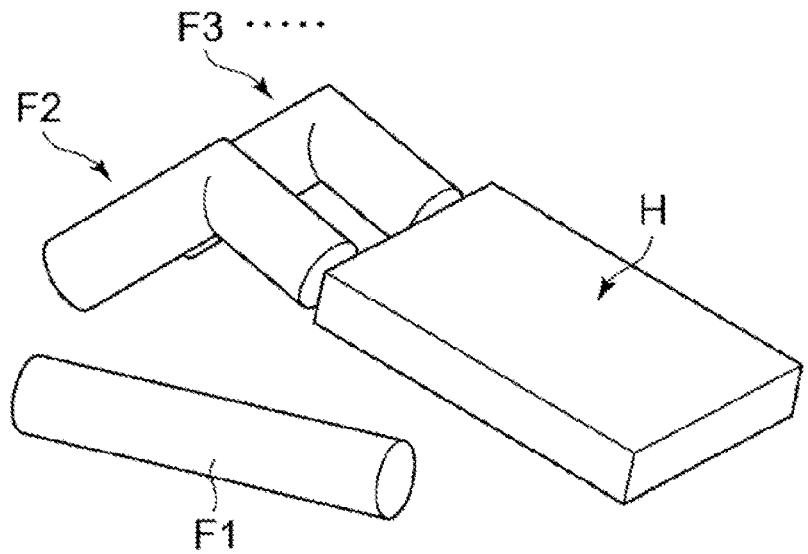
FIG. 5 is an explanatory diagram illustrating an example of a virtual manipulator displayed by the information processing apparatus according to the embodiment of the present invention.

To be specific, the manipulator may be a three-dimensional model representing a user's hand or fingers. In this example, as illustrated in FIG. 5, the manipulator has cylindrical shape portions F1, F2, . . . each having one joint corresponding to at least some of the user's fingers, and a part H corresponding to a hand, having a flat plate shape.

The operation display section 113 determines the position, shape, and posture of the manipulator in the virtual space, on the basis of the information related to the virtual object in the virtual space set by the virtual space setting processing section 111, and the information representing the operation received by the operation receiving section 112. As an example, in a case where the manipulator has a portion H corresponding to the user's hand and portions F1, F2, . . . corresponding to the respective fingers as illustrated in FIG. 5, the operation display section 113 sets the position and posture (a normal direction to a relatively wide surface of the circumscribed cuboid) of the portion H corresponding to the hand on the basis of information regarding the position and posture of the user's hand. Further, the operation display section 113 temporarily determines the postures (joint angles) of the portions F1, F2, . . . corresponding to the user's fingers in the manipulator in accordance with the degree of bending of the corresponding user's finger.

That is, the operation display section 113 sets the position and posture of the portion H corresponding to the hand of the manipulator in the virtual space on the basis of the information regarding the position and posture of the user's hand, and temporarily sets the shape (joint angle) of portions F1, F2, . . . corresponding to the user's fingers such that the degree of bending is equal to that of the corresponding user's finger. Then, when this setting is performed, the operation display section 113 checks whether or not the positions of the tips of the portions F1, F2, . . . corresponding to the user's fingers collide with the position of the object arranged in the virtual space (whether or not the same position is occupied). The operation display section 113 keeps the angle of the joint of the portions F1, F2, . . . corresponding to the user's fingers, in which the tip (the end on the side different from the hand H side) does not collide with the object arranged in the virtual space equal to the temporarily determined degree of bending of the corresponding user's finger.

On the other hand, the operation display section 113 changes the angle of the joints of the portions (referred to as Fn) out of the portions F1, F2, . . . corresponding to the user's fingers, in which the tip and the object arranged in the virtual space are determined to collide with each other, to an angle at which the tip of the portion Fn comes into contact with the object arranged in the virtual space. As an example, the operation display section 113 changes the angle from the angle Fθn, which is equivalent to the temporarily determined bending degree of the corresponding user's finger, to the horizontal direction (180 degrees) by a predetermined angle A each time, until reaching a state where the tip of the portion Fn does not collide with the object arranged in the virtual space. Then, the operation display section 113 sets the angle of the joint when reaching a state where the positions of the tip of the portion Fn and the object arranged in the virtual space do not collide with each other as the joint angle of the portion Fn.

The determination processing section 114 determines the magnitude of the virtual force that the virtual manipulator set by the operation display section 113 gives to the virtual object that is in contact with the manipulator. As an example of the present embodiment, in a case where the manipulator has a portion H corresponding to the user's hand and portions F1, F2, . . . corresponding to respective fingers, as illustrated in FIG. 5, the determination processing section 114 acquires the difference between respective joint angles Fθ1, Fθ2, . . . and the information θ1, θ2, . . . regarding the bending degrees of the user's fingers corresponding to respective portions F1 , F2, . . . , f1=θ1−Fθ1, f2=θ2−Fθ2, . . . .

for each of the portions F1, F2, . . . corresponding to the user's fingers, as the magnitude of the virtual force that the manipulator applies to the virtual object in contact with the manipulator.

The presentation processing section 115 presents information indicating the magnitude of the force determined by the determination processing section 114 to the user. In one example of the present embodiment, the presentation processing section 115 sets colors in accordance with the force magnitude values f1, f2, . . . determined by the determination processing section 114 for each of the portions F1, F2, . . . corresponding to the fingers of the manipulator. For example, out of the saturation Cs, brightness Cb, and hue Ch for this color, the saturation Cs and the hue Ch are determined in advance, and the brightness value Cbn of the portion Fn is determined as Cbn=CbØ+αfn by using the determined value fn of the corresponding force magnitude. Here, CbØ is a value when f=0 is satisfied (a state in which an object is not touched), and α is appropriately determined experimentally.

The image generating section 116 renders a virtual object in the virtual space set by the virtual space setting processing section 111, and the virtual manipulator for which the operation display section 113 sets the position, posture, and shape, and the presentation processing section 115 determines the color, to generate an image in a predetermined field of view viewed from a virtual camera arranged at a predetermined position in a virtual space.

The control unit 11 outputs the image generated by the image generating section 116 to a display or a head mounted display via the output unit 14, and presents the image in the virtual space to the user. Further, when the manipulator set by the operation display section 113 and the virtual object in the virtual space set by the virtual space setting processing section 111 are in contact with each other, the control unit 11 may change the position and posture of the virtual object in accordance with the magnitude of the force determined by the determination processing section 114, the contact angle with the manipulator and the like. For example, when one portion of the manipulator is in contact with the virtual object, the virtual object is moved in the direction of the force, assuming that a force is applied to the portion. Further, when two or more manipulator parts are in contact with the virtual object, it is determined that the virtual object is caught by the manipulator, and the position of the virtual object is moved in conformity with the amount of movement of the manipulator (represents the state of grabbing and moving).

Operation

The present embodiment has the above configuration and operates as follows. It is assumed that the user wears a head mounted display, for example, and wears the operation device 20 including a sensor for measuring the degree of bending of the fingers at least one of the left and right hands.

The information processing apparatus 1 generates an image to be displayed on the head mounted display. In the present embodiment, the information processing apparatus 1 performs rendering and outputs an image in a virtual space as an image viewed from a predetermined visual field. This visual field may be changed in accordance with the position and angle of the head mounted display.

Figure 6:
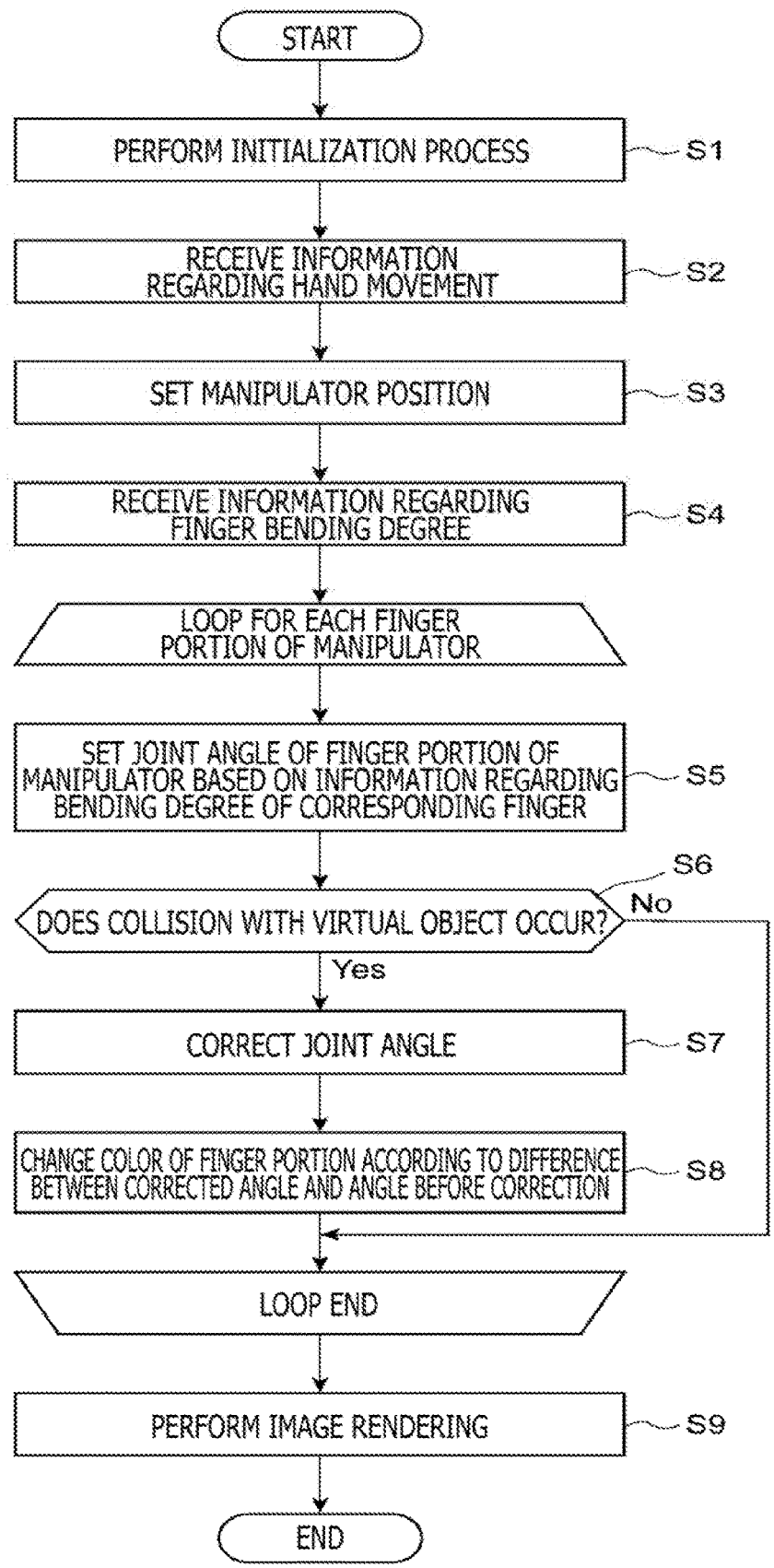
FIG. 6 is a flowchart illustrating an operation example of the information processing apparatus according to the embodiment of the present invention.

As illustrated in FIG. 6, the information processing apparatus 1 arranges a virtual object in a virtual space to be displayed, as processing of a game application, for example. In addition, the information processing apparatus 1 arranges a virtual manipulator corresponding to the user's hand in this virtual space (initialization process: S1).

Here, when the user moves the user's hand in the direction of the virtual object in order to grasp the virtual object in the virtual space with reference to the image in the virtual space, the information processing apparatus 1 receives information regarding the movement amount of the hand from the operation device 20 (S2), for example, and the position of the manipulator in the virtual space is moved for setting by the movement amount according to the movement amount of the hand (S3).

When the user bends a finger to grasp a virtual object with the finger, information regarding the degree of bending of the finger is detected by the operation device 20 and output to the information processing apparatus 1. The information processing apparatus 1 receives the information regarding the degree of bending of the finger (S4), and sets the joint angle of the portion of the manipulator corresponding to each finger on the basis of the information regarding the degree of bending of the corresponding finger received in step S4 (S5). At this time, the information processing apparatus 1 determines whether or not a collision with a virtual object in the virtual space has occurred for a portion of the manipulator corresponding to each finger (S6), and when determining that the collision has occurred (S6: Yes), the information processing apparatus 1 corrects the angle of the joint of the manipulator corresponding to the finger determined to have collided to an angle of the joint at which the portion touches the surface of the virtual object (S7).

The information processing apparatus 1 changes the color of the portion of the manipulator corresponding to each finger in accordance with the angle set on the basis of the bending degree information of the corresponding finger and the angle corrected in the process S7 (S8). For example, the color is set to a color having a brightness proportional to the difference between these angles.

Note that when it is determined in the process S6 that the portion corresponding to the finger does not collide with the virtual object in the virtual space (process S6: No), the processes S7 and S8 are not performed. At this time, the portion is set to a predetermined color (initial color). The information processing apparatus 1 repeats the processing S5 to S8 for each portion of the manipulator corresponding to each finger.

Then, the information processing apparatus 1 performs rendering to generate an image in the virtual space after the setting, and outputs the image to the head mounted display for presenting the image to the user (S9).

Figure 7:
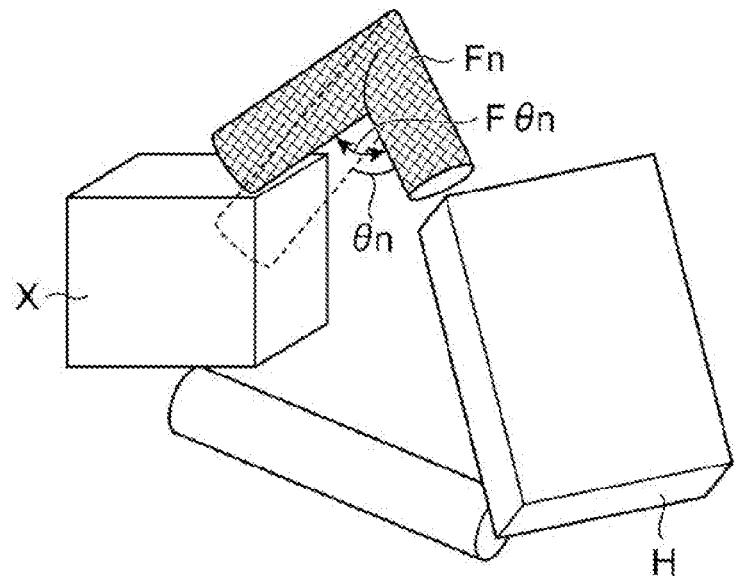
FIG. 7 illustrates explanatory diagrams illustrating examples of information presentation by the information processing apparatus according to the embodiment of the present invention.
Figure 7:
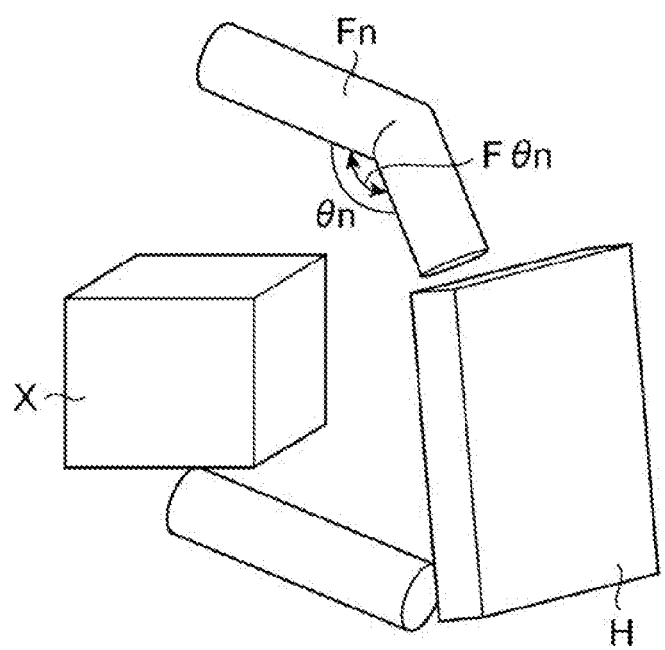

As described above, in the present embodiment, if it is determined that the collision occurs with the virtual object X in the virtual space when the joint angle of the portion Fn of the manipulator corresponding to the finger set in accordance with the degree of bending of the finger is θn, the information processing apparatus 1 corrects the joint angle to a joint angle Fθn which enables the manipulator to touch the object X, as illustrated in FIG. 7.

Therefore, the angle of the joint of the virtual manipulator is not changed up to the angle θn specified by the user, and the difference θn−Fθn occurs. The information processing apparatus 1 of the present embodiment changes the color of the portion Fn related to the corresponding joint of the manipulator in accordance with the difference θn−Fθn (FIG. 7(a)). When the user actually changes the bending degree of the finger and extends the finger (opens at the joint), the angle difference θnθFθn becomes smaller, and when the angle is determined not to cause the collision, the angle difference is "0" thereafter. In this case, the color of the portion Fn related to the corresponding joint of the manipulator becomes a color determined in advance before the change (FIG. 7(b)). Incidentally, a change in color is indicated by hatching for convenience of illustration in FIG. 7(a).

By referring to the displayed color of the portion of the manipulator, the user can know how much (virtual) force the user is holding the virtual object with, and can adjust the detailed force so that the operability of the user can be improved.

Other Examples of Presentation Method

In the description so far, the presentation processing section 115 of the control unit 11 sets the colors in accordance with the force magnitude values f1, f2, . . . determined by the determination processing section 114 for each of the portions F1, F2, . . . corresponding each finger of the manipulator in order to present information indicating the magnitude of the force determined by the determination processing section 114 to the user. However, the present embodiment is not limited to this. For example, instead of the color, or together with the color, the presentation processing section 115 may change the texture for each of the portions F1, F2, . . . corresponding to the fingers of the manipulator, in accordance with the force magnitude values f1, f2, . . . determined determined by the determination processing section 114.

As an example, the control unit 11 may change the texture density (repetition cycle) in accordance with the force magnitude values f1, f2, . . . determined by the determination processing section 114.

Also, the presentation processing section 115 of the control unit 11 may change the transmittance for each of the portions F1, F2, . . . corresponding to the fingers of the manipulator, instead of the color or the texture or together with at least one of the color or the texture.

Further, the presentation processing section 115 of the control unit 11 may periodically change the color for each of the portions F1, F2, . . . corresponding to the fingers of the manipulator, and determine the color changing cycle depending on the magnitude of the force values f1, f2, . . . determined by the determination processing section 114. For example, when the force fn increases, the color changing cycle of the portion Fn corresponding to the corresponding finger of the manipulator is set to be shorter.

Also according to these, the user can know how much (virtual) force the user is holding the virtual object with, by referring to the color, changing cycle of the color, texture, or transmittance of the portion of the displayed manipulator, and user's operability can be improved.

Further, although in the examples so far, the presentation processing section 115 of the control unit 11 sets the color or the like in accordance with the force magnitude values f1, f2, . . . determined by the determination processing section 114 for each of the portions F1, F2, . . . corresponding to the fingers of the manipulator so as to present the information indicating the magnitude of the force determined by the determination processing section 114 to the user, the present embodiment is not limited to this, and the presentation processing section 115, instead of or together with the color or the like of the portions F1, F2, . . . corresponding to the fingers of the manipulator, may change the color, texture, transmittance, or color changing cycle of the surface of the virtual object (at least one part of the virtual objects) in contact with the portions F1, F2, . . . corresponding to the fingers of the manipulator.

Further, in another example of the embodiment of the present invention, the portion Fn may be changed in size (volume), shape, or the like, depending on the force magnitude values f1, f2, . . . determined by the determination processing section 114 for each of the portions F1, F2, . . . corresponding to the manipulator fingers.

Another Example of Information Presentation Mode

Further, in the present embodiment, when the presentation processing section 115 presents the information indicating the magnitude of the force determined by the determination processing section 114, depending on the size of the portion of the virtual object with which the corresponding manipulator is in contact, the size of the region where the color, texture, or transmittance changes may be changed.

For example, in a case where the virtual object in the virtual space is represented by a polyhedron (polygon or the like), the presentation processing section 115 obtains an area of the surface of the virtual object closest to each of the portions in which the magnitude value fn of the corresponding force is not "0" (those determined to collide with the object when the joint angle is determined on the basis of the degree of bending of the user's finger) from among the portions F1, F2, . . . corresponding to the fingers of the manipulator. Here, it is sufficient that the closest surface of the object is determined to be the surface that was in contact when the operation display section 113 determined that the collision occurred.

The presentation processing section 115 changes, depending on the obtained area, the size of the region where the color, texture, or transmittance of the portion F corresponding to the manipulator finger or a portion of the virtual object in contact with the portion is changed. For example, the presentation processing section 115 changes a color (or texture, transmittance, or the like) in a range of a radius r centered on a tip of the portion F corresponding to the manipulator finger, depending on the magnitude of the force, and sets the radius r to be a value proportional to the area of the surface of the virtual object, closest to the portion F.

According to this, the user can know the size of the surface of the object to be grasped by knowing how large the range where the color is changed in the tip of the portion corresponding to the finger of the manipulator is.

Display by Gauge

Furthermore, in an example of the present embodiment, instead of or in addition to changing the color, texture, or transmittance of the portion F corresponding to the finger of the manipulator or the portion of the virtual object with which the portion is in contact, a gauge (a bar that expands or contracts in accordance with the magnitude of the force or a pie graph gauge whose color changing range is controlled in accordance with the magnitude of the force) indicating the magnitude of the corresponding force determined by the determination processing section 114 may be displayed in the vicinity of the corresponding portion (a position within a predetermined distance from the corresponding portion). Alternatively, the display position of the gauge may be on the hand portion H of the manipulator.

[Example of Presenting Information to Operation Device]

Further, in an example of the present embodiment, the presentation processing section 115 may instruct the operation device 20 to present information to the user instead of changing the image to be presented to the user.

In this example, it is assumed that the operation device 20 includes a vibration element such as a VCM (Voice Coil Motor), an eccentric motor (ERM: Eccentric Rotating Mass), or a speaker.

The presentation processing section 115 according to this example transmits, to the operation device 20, information related to the magnitude of the force determined by the determination processing section 114 for each finger. The control unit 21 of the operation device 20 controls the vibration mode of the vibration element such as the VCM in accordance with the magnitude of the force represented by the received information.

The control of the vibration mode here includes, as an example, control for changing the amplitude such as increasing the amplitude as the magnitude of the force represented by the received information is larger, or control for changing the cycle of vibration such as shortening the vibration cycle as the magnitude of the force represented by the received information is larger. Further, the vibration may be generated intermittently, and the time length during a period without vibration may be controlled in accordance with the magnitude of the force represented by the received information. According to this, the magnitude of sound or vibration, the frequency, the tempo of vibration (period of the intermittent vibration), or the like changes in response to the information regarding the magnitude of the force determined in the information processing apparatus 1, so that the user can know how much (virtual) force the user is holding a virtual object with, and detailed adjustments can be applied to the force, thereby improving user's operability.

Further, the operation device 20 may include a vibration element for each finger of the user (at least for each finger corresponding to each finger portion of the manipulator displayed by the information processing apparatus 1). In this case, for example, the user holds the operation device 20 by placing each finger at a position where the vibration of each vibration element is transmitted.

Then, the control unit 21 of the operation device 20 receives the information related to the magnitude of the force determined by the determination processing section 114 for each finger portion of the manipulator, and in response to the information, changes the amplitude or frequency of the vibration of the vibration element that transmits vibration to the position where the corresponding finger is disposed, or changes the period of the intermittent vibration in a case where the intermittent vibration is applied. In this case, the user can know how much (virtual) force the user is holding a virtual object with through the state of vibration for each finger, and can adjust the detailed force, so that the operability of the user can be improved.

Further, although the case where the vibration is generated has been described as an example here, the operation device 20 may include a heating element (a device capable of controlling a heating temperature by an electric signal output) instead of or together with the vibration element. In this case, the control unit 21 of the operation device 20 transmits information related to the magnitude of the force determined by the determination processing section 114 for each finger. The control unit 21 of the operation device 20 controls the heating temperature of the heating element in accordance with the magnitude of the force represented by the received information. This heating element is also provided for each position where the user's finger is arranged, and the control unit 21 may control the heating temperature of the heating element for the corresponding finger in response to the corresponding information regarding the magnitude of the force included in the received information for each finger.

Other Examples of Manipulators

Further, in the above description, the virtual manipulator has a shape having a hand portion and a finger portion, imitating the shape of the user's hand, but the present embodiment is not limited to this, and a shape imitating a gripper capable of opening and closing may be employed so that the opening of the gripper may be determined in accordance with the degree of bending of the user's finger. As an example, the opening may be determined in accordance with a statistic such as an average value of information regarding the bending degree of each user's finger.

In this example, the information processing apparatus 1 determines the magnitude of a virtual force applied to a virtual object by a virtual manipulator, by using a difference between the opening determined in accordance with the degree of bending of the user's finger and the corrected opening due to a result of the determination for the collision with the object in the virtual space.

REFERENCE SIGNS LIST

1 Information processing apparatus, 11 Control unit, 12 Storage unit, 13 Interface unit, 14 Output unit, 20 Operation device, 21 Control unit, 22 Storage unit, 23 Operation interface, 24 Sensor unit, 25 Communication unit, 111 Virtual space setting processing section, 112 Operation receiving section, 113 Operation display section, 114 Determination processing section, 115 Presentation processing section, 116 Image generating section, 210 Device main body, 211 Grip portion, 212 Operation unit, 213 Finger motion detecting unit.

The invention claimed is:

1. An information processing apparatus that arranges a virtual object in a virtual space, generates an image in the virtual space, and presents the image to a user, the information processing apparatus comprising:
receiving means for receiving information representing an operation from the user;
manipulator display means for displaying a virtual manipulator for operating the virtual object in the virtual space in accordance with the received information representing the operation;
determining means for determining a magnitude of a virtual force applied by the virtual manipulator to the virtual object at a point of contact; and
presenting means for presenting information representing the determined magnitude of the force to the user,
wherein the presenting means presents the information by changing a visual attribute of the virtual manipulator selected from a group of color, texture and transmittance in a range of a radius centered on the point of contact, based on the magnitude of the force, and wherein the sets the radius to be a value proportional to the area of the surface of the virtual object.

2. The information processing apparatus according to claim 1, wherein the receiving means receives, from the user, information regarding a bending angle of each finger of the user as the information representing the operation,
the manipulator display means is means for displaying the manipulator corresponding to at least some of fingers of the user, and determines a posture of the corresponding manipulator to display the manipulator, based on the information regarding the bending angle of each finger, the information being represented by the information received by the receiving means and a determination result of collision with the virtual object arranged in the virtual space, and
the determining means determines the magnitude of the virtual force applied by the virtual manipulator to the virtual object, based on the posture of the manipulator determined by the manipulator display means and the information regarding the bending angle of a corresponding finger.

3. The information processing apparatus according to claim 2, wherein the determining means determines the magnitude of the virtual force applied by the virtual manipulator to the virtual object, based on a difference between the posture of the manipulator determined by the manipulator display means and the information regarding the bending angle of the corresponding finger.

4. The information processing apparatus according to claim 1, wherein
in a case where the presenting means presents the information representing the determined magnitude of the force by changing the color, texture, transmittance, or cycle of color change of the portion of the corresponding manipulator or the virtual object with which the manipulator is in contact, in accordance with the information, the presenting means changes a size of a region where the color, texture, or transmittance depending on a size of the portion of the virtual object with which the virtual manipulator is in contact.

5. The information processing apparatus according to claim 1, wherein the presenting means presents the information representing the determined magnitude of the force by an output voice.

6. The information processing apparatus according to claim 1, wherein the information processing apparatus is communicably connected to a controller operated by the user, and the presenting means outputs an instruction to present the information representing the determined magnitude of the force to the controller.

7. A method for processing information by using an information processing apparatus that arranges a virtual object in a virtual space, generates an image in the virtual space, and presents the image to a user, the method comprising:
by receiving means, receiving information representing an operation from the user;
by display means, displaying a virtual manipulator for operating the virtual object in the virtual space in accordance with the received information representing the operation;
by determining means, determining a magnitude of a virtual force applied by the virtual manipulator to the virtual object; and by presenting means, presenting information representing the determined magnitude of the force to the user, wherein the presenting means presents the information by changing a visual attribute of the virtual manipulator selected from a group of color, texture and transmittance in a range of a radius centered on the point of contact, based on the magnitude of the force, and wherein the sets the radius to be a value proportional to the area of the surface of the virtual object.

8. A non-transitory computer readable medium having stored thereon a program for a computer, the program comprising:

means for arranging a virtual object in a virtual space, generating an image in the virtual space, and presenting the image to a user;

receiving means for receiving information representing an operation from the user;

manipulator display means for displaying a virtual manipulator for operating the virtual object in the virtual space in accordance with the received information representing the operation;

determining means for determining a magnitude of a virtual force applied by the virtual manipulator to the virtual object; and presenting means for changing a texture density and a volume of the virtual manipulator in proportion to the determined magnitude of the force, wherein the presenting means presents the information by changing a visual attribute of the virtual manipulator selected from a group of color, texture and transmittance in a range of a radius centered on the point of contact, based on the magnitude of the force, and wherein the sets the radius to be a value proportional to the area of the surface of the virtual object.

9. The method according to claim 7, wherein a size of the virtual manipulator is changed in proportion to the determined magnitude.

* * * * *